(12) United States Patent
Birdeau

(10) Patent No.: US 10,969,931 B2
(45) Date of Patent: Apr. 6, 2021

(54) DATA MAPPING SERVICE

(71) Applicant: TIBCO Software Inc., Palo Alto, CA (US)

(72) Inventor: Lucas Birdeau, San Francisco, CA (US)

(73) Assignee: TIBCO SOFTWARE INC., Palo Alto, CA (US)

( * ) Notice: Subject to any disclaimer, the term of this patent is extended or adjusted under 35 U.S.C. 154(b) by 549 days.

(21) Appl. No.: 14/336,173

(22) Filed: Jul. 21, 2014

(65) Prior Publication Data
US 2016/0019196 A1 Jan. 21, 2016

(51) Int. Cl.
*G06F 3/0482* (2013.01)
*G06F 3/0484* (2013.01)

(52) U.S. Cl.
CPC ........ *G06F 3/0482* (2013.01); *G06F 3/04842* (2013.01)

(58) Field of Classification Search
CPC ........ G06F 17/24; G06F 17/25; G06F 3/0482; G06T 11/60; A63F 2300/5553; A63F 2300/6623
USPC ................................. 715/201, 202, 230, 255
See application file for complete search history.

(56) References Cited

U.S. PATENT DOCUMENTS

| | | | | |
|---|---|---|---|---|
| 5,537,590 A | * | 7/1996 | Amado | G06F 16/24564 |
| 9,201,558 B1 | * | 12/2015 | Dingman | G06F 3/048 |
| 9,430,114 B1 | * | 8/2016 | Dingman | G06F 16/211 |
| 2002/0194196 A1 | * | 12/2002 | Weinberg | G06F 16/258 |
| 2005/0149536 A1 | * | 7/2005 | Wildes | G06F 8/20 |
| 2007/0127426 A1 | * | 6/2007 | Watters | H04L 67/125 370/338 |
| 2007/0203923 A1 | * | 8/2007 | Thomas | G06F 17/30294 |
| 2007/0226241 A1 | * | 9/2007 | Ng | G06F 17/3056 |
| 2012/0254832 A1 | * | 10/2012 | Aman | G06F 16/24 717/109 |
| 2013/0191404 A1 | * | 7/2013 | Holmes | G06F 17/3092 707/755 |

OTHER PUBLICATIONS

Oracle Data Mapping user guideline (Year: 2011).*
Oracle Data Mapping user guide by Oracle v.3.3 Part No. E20562—May 2, 2011 (Year: 2011).*

* cited by examiner

*Primary Examiner* — Kavita Stanley
*Assistant Examiner* — Jenq-Kang Chu
(74) *Attorney, Agent, or Firm* — McGuireWoods LLP

(57) ABSTRACT

Data mapping techniques are disclosed. A representation of a first destination data field to which data is to be mapped is provided via a displayed user interface. One or more other destination data fields are not displayed at the same time as the first destination data field is displayed. A user input comprising a selection of a source data input field to be used to determine a data value for the first destination field is received. The displayed user interface is updated to include a representation of the selected source data input field and a control, wherein user interface code with which the displayed user interface is associated is responsive to provide via the displayed user interface a set of structurally valid options to further define how the data value for the first destination field is to be determined.

22 Claims, 19 Drawing Sheets

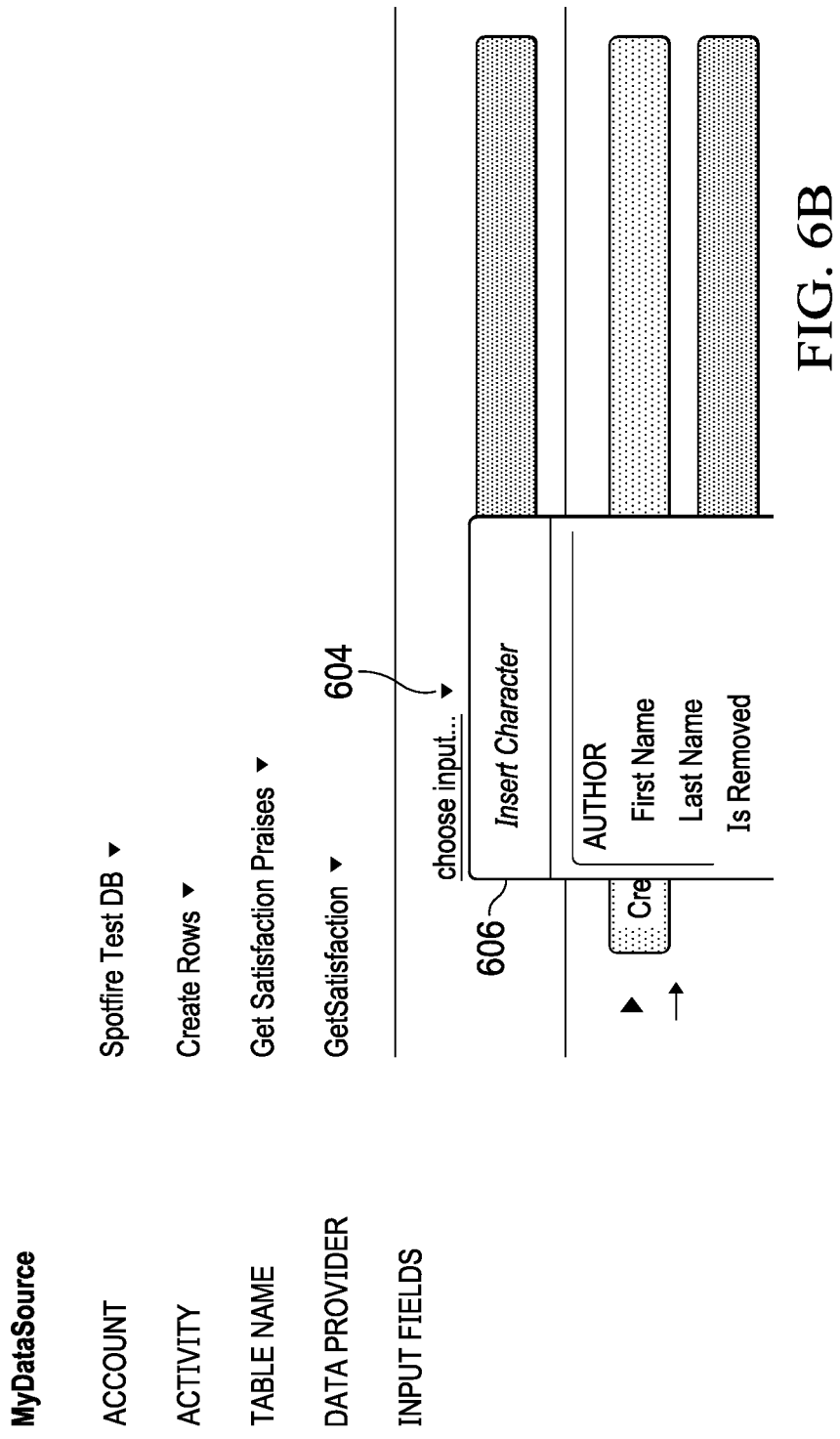

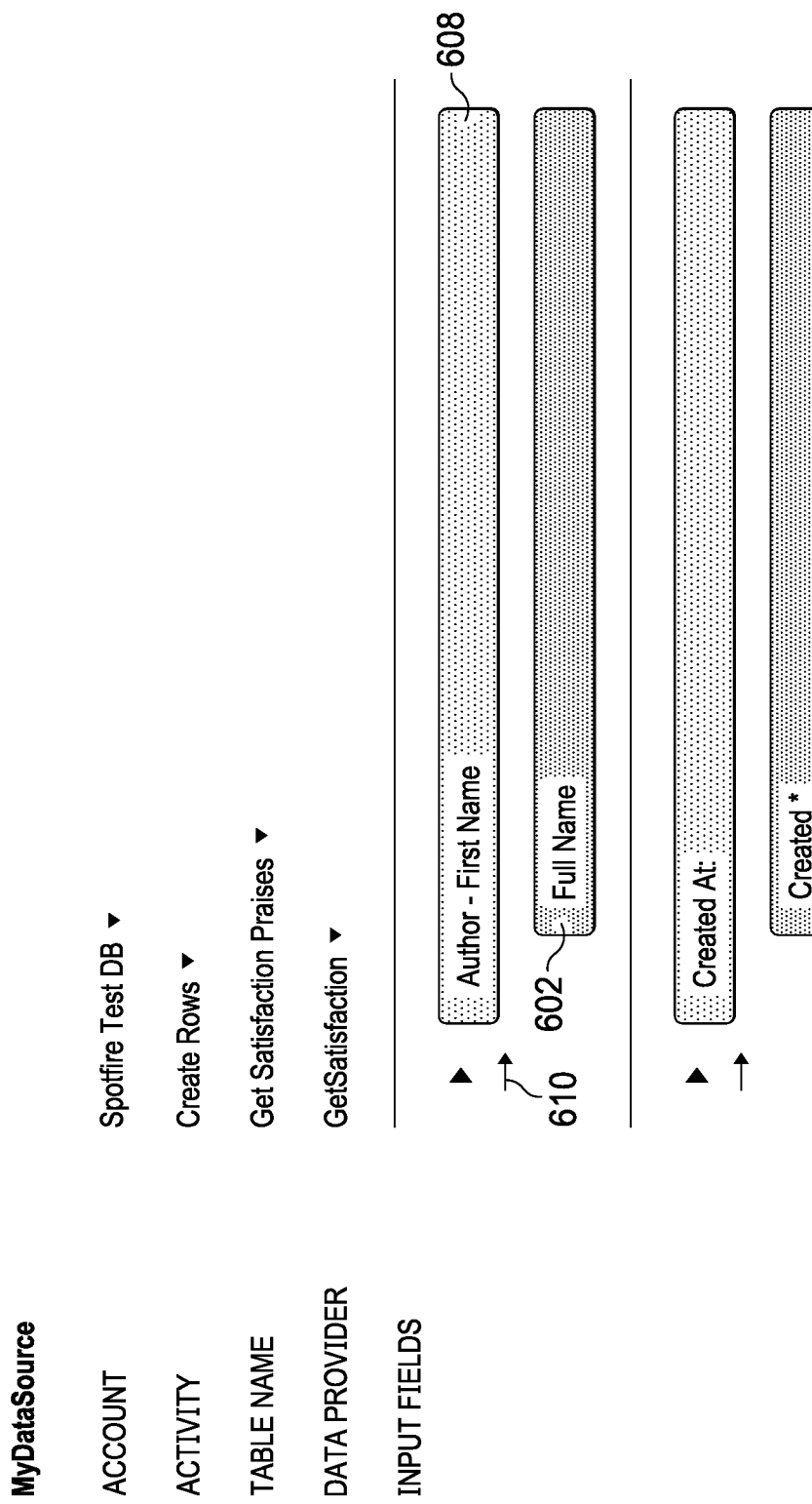

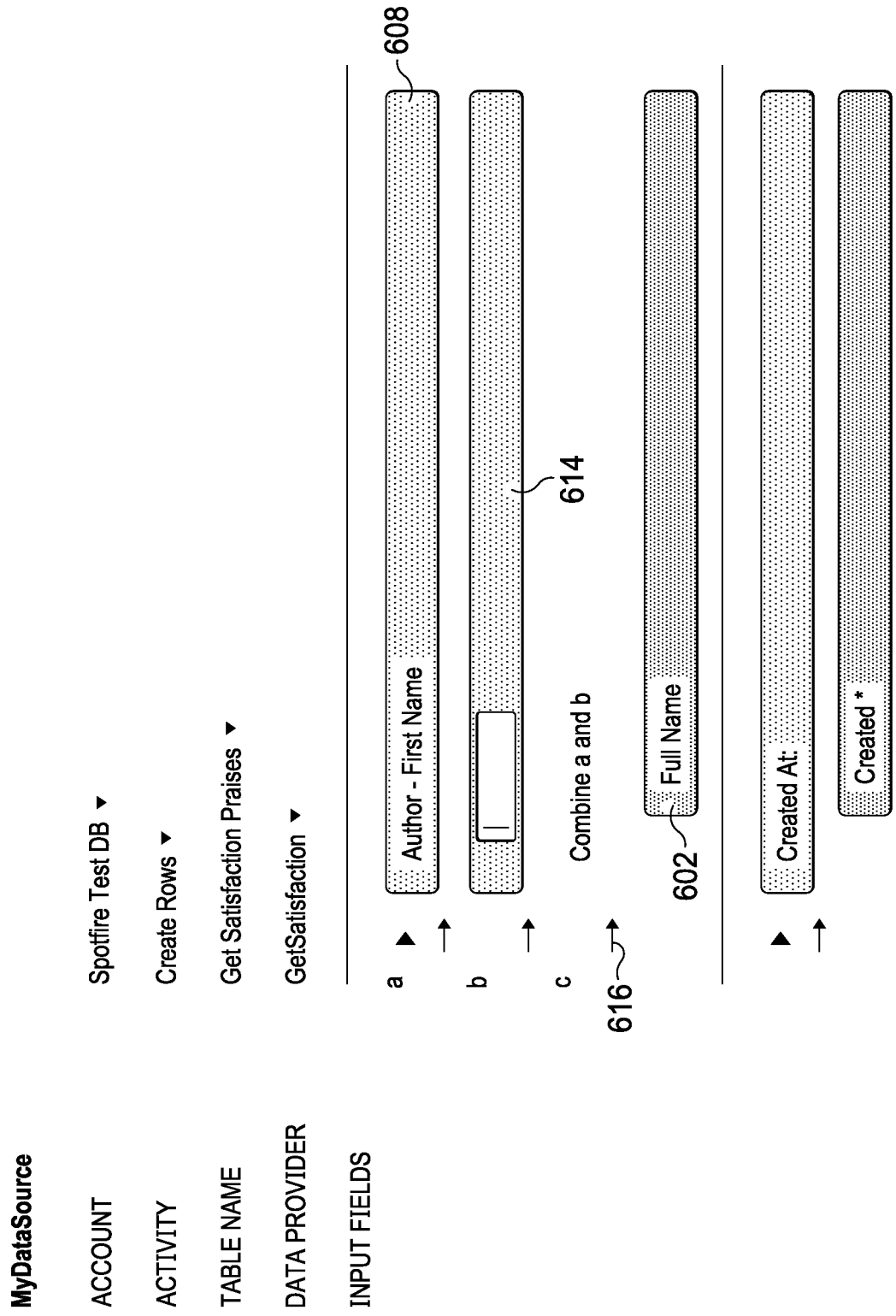

DATA MAPPING SERVICE

BACKGROUND OF THE INVENTION

Data mapping and integration services enable users to map data values as stored in a first data storage system and/or service to corresponding values as defined in the context of a second data storage system and/or service. For example, a user may desire to access via a user interface or other construct associated with the second system data values store in the first system and/or one or more other systems. In each system or service, a system or service-specific schema may be used to store data values in a structured manner. For example, each of a plurality of schemas may embody a concept of a "person", each having a set of named data values (attributes) associated with them. However, the names used for the respective attributes, the number and meaning of the respective attributes, the manner in which they are stored, the values considered in the respective systems to be valid for an attribute (e.g., can a user identifier include letters?), the hierarchical structure used to organize the attributes, etc., may be different in each system.

Tools have been provided to enable users to define a mapping between values as stored in a first system or service and corresponding values as stored in a second system or service. Typically, such tools have provided a graphical user interface in which data values as stored on the first system are displayed in a first display area and corresponding values defined in the second system are displayed in a second display area, and a connector or other tool is used to map entities in the first area to corresponding entities in the second area. For example, a user might select an entity "first_name" in the first display area and use a tool to map that value to an entity "given_name" in the second display area. For more complex data objects and/or hierarchies, such an interface can result in a complicated web of mappings being displayed simultaneously.

BRIEF DESCRIPTION OF THE DRAWINGS

Various embodiments of the invention are disclosed in the following detailed description and the accompanying drawings.

FIG. 6B shows the interface 600 in a state in which a user has selected the "choose input" control 604.

FIG. 6C shows the interface 600 in a state in which the user has selected from the menu 606 of FIG. 6B the option to insert the source data field "First Name" from the entity "Author", as indicated in inserted field display object 608.

FIG. 6E shows the interface 600 in a state in which the user has selected the option to "insert character" from the menu 612 of FIG. 6D.

DETAILED DESCRIPTION

Figure 1:
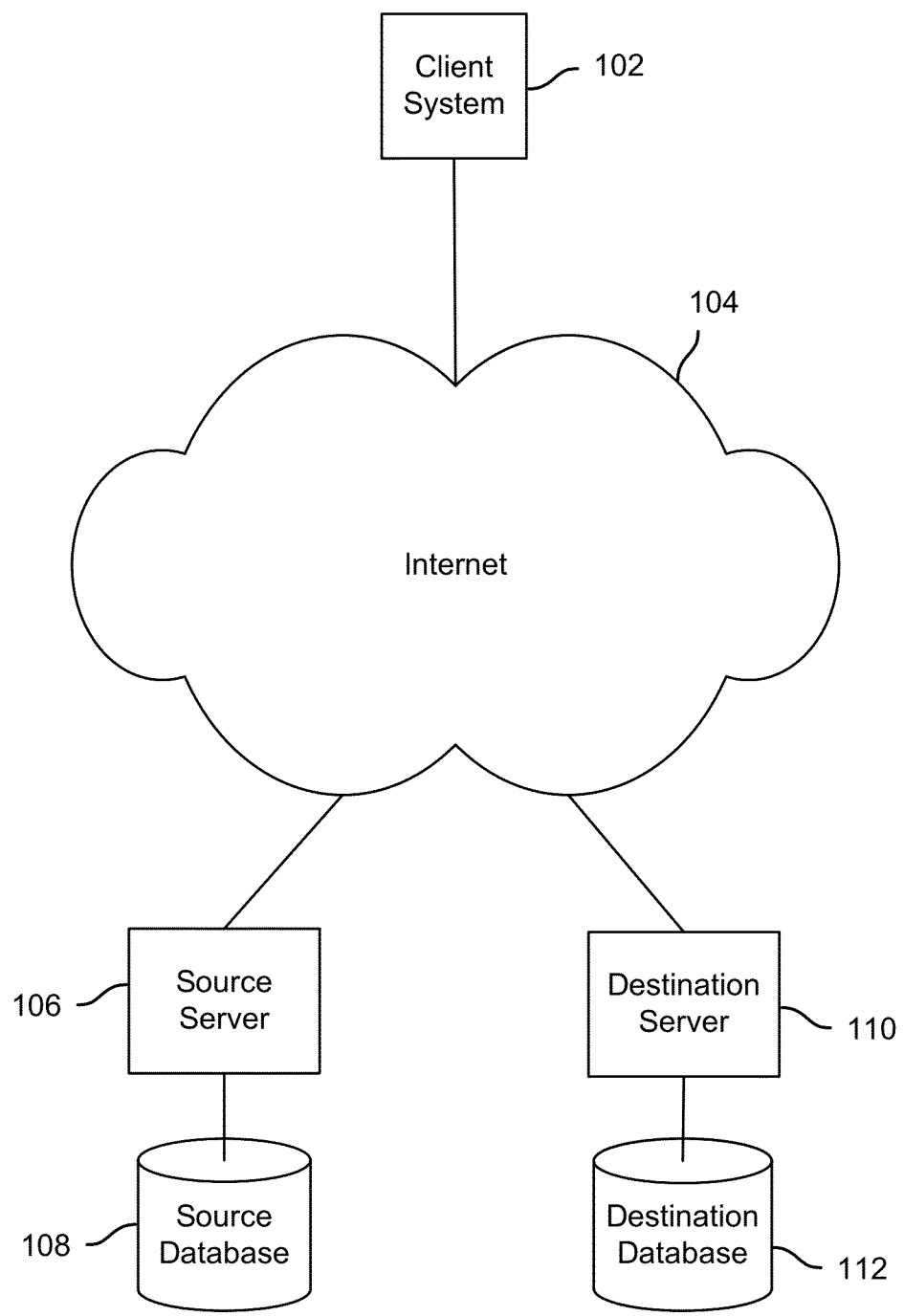
FIG. 1 is a block diagram illustrating an embodiment of a system and environment to provide a data mapping service.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A data mapping service is disclosed. In various embodiments, an interface is provided to enable a user to define a mapping from a source data field (or other entity) associated with data as stored at and/or otherwise available from a first data source to a destination data field associated with a second (destination) data system and/or service. In various embodiments, the interface enables the user to define transformations and/or operations to be performed on and/or with respect to the data in connection with the mapping. In various embodiments, a progressive interface is provided. Data fields as defined at the destination data storage system are presented one by one. A progressive interface walks a user through a definition of a mapping of one or more source data fields of the source data storage system or service to the destination data field, including as applicable and/or desired transformation (e.g., keep/remove letters, numerals, or other characters; change case; etc.) and/or operations (e.g., insert a space or other characters, insert a (further) source data field, etc.). In various embodiments, mapping and associated processing steps are displayed, as they are defined by the using, using a postfix-type notation and order. In some embodiments, using a postfix notation facilitates serialization of the definition and/or generation of code to implement the definition. In some embodiments, contextually-determined menus that provide only structurally valid actions are provided, to guide the user in defining a valid mapping.

FIG. 1 is a block diagram illustrating an embodiment of a system and environment to provide a data mapping service. In the example shown, a client system 102 is connected via a network 104 to a source server 106 associated with a source database 108 and to a destination server 110 associated with a destination database 112. While in the example shown in FIG. 1 the source and destination data stores are databases, in various embodiments other data stores and or services may be used as the data source and/or as the destination. In various embodiments, client system 102 may access a data mapping service via software running on one or more of the client system 102, destination server 110, and/or a data mapping service residing on a data mapping server not shown in FIG. 1. In various embodiments, the data mapping service enables a user of client system 102 to define a data mapping via a user interface as disclosed herein. The mapping, in various embodiments, may be used by the data mapping service to retrieve data records from the source database 108, via the server 106, transform and/or perform operations on the retrieved data, if/as indicated by the mapping definition, and store the resulting data in one or more records in destination database 112 (via destination server 110).

Figure 2:
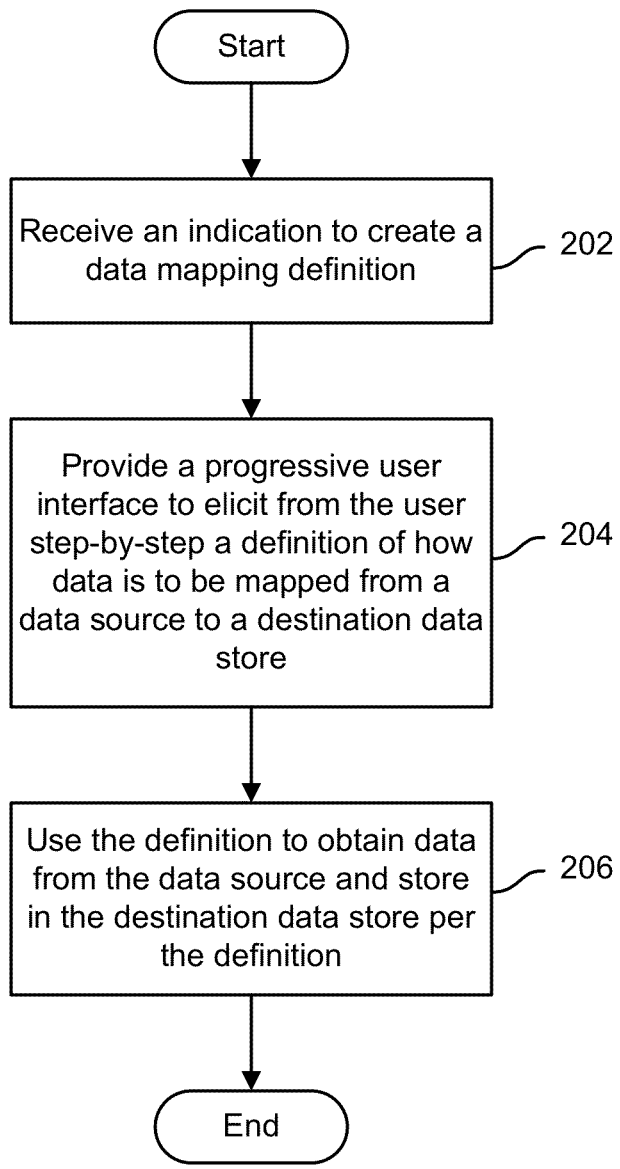
FIG. 2 is a flow chart illustrating an embodiment of a process map data from a data source to a destination.

FIG. 2 is a flow chart illustrating an embodiment of a process map data from a data source to a destination. In the example shown, an indication to create a data mapping definition is received (202). A progressive user interface is provided, to elicit from the user, in a step-by-step manner, one destination data field at a time, a definition of how data from the source is to be retrieved and/or used to determine data values to be mapped to the destination data field(s) (204). The definition, once completed, is used to obtain data from the data source and to store data in the respective destination fields of the destination data store (e.g., one or more tables of a destination database), per the data mapping definition (206).

Figure 3:
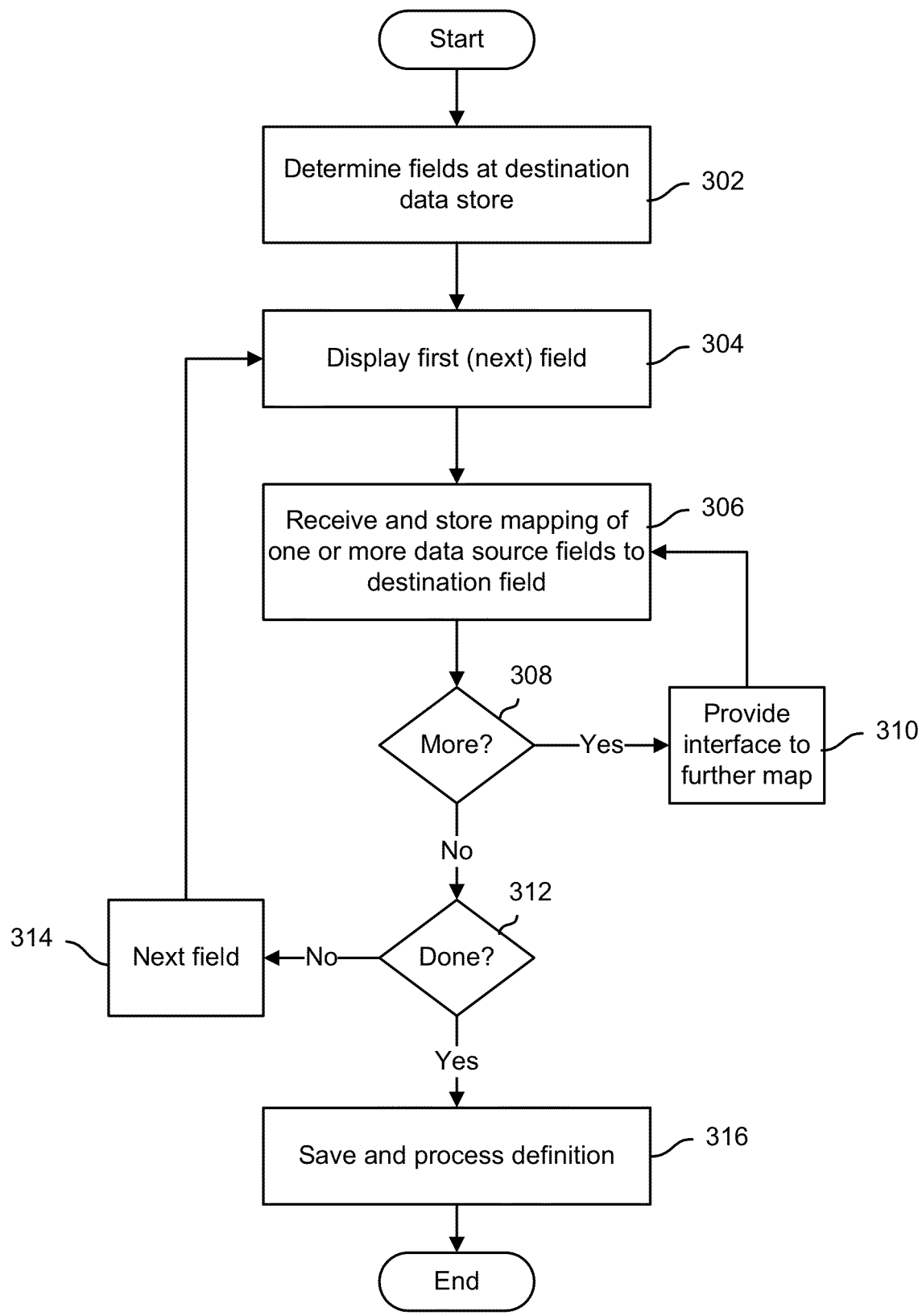
FIG. 3 is a flow chart illustrating an embodiment of a process to define a data mapping.

FIG. 3 is a flow chart illustrating an embodiment of a process to define a data mapping. In some embodiments, the process of FIG. 3 is used to implement step 204 of the process shown in FIG. 2. In the example shown, fields to be populated at the destination data store are determined (302).

In various embodiments, a hierarchical structure of data as stored at the destination data store may be determined. The information regarding the hierarchical structure of the data may be used in various embodiments to display to the user information that may be useful to the user in understanding which data values from the data source should be mapped to the data value bearing "leaf" nodes of the hierarchy. In some embodiments, only the leaf nodes are displayed via the user interface as entities, e.g., destination "fields", to which data from the data source may be mapped. A visual representation of a first or other current destination data field to which data from the source is to be mapped is displayed (304). For example, the user may select a destination field from a drop down or other menu. A mapping defining how one or more source data fields are to be used (e.g., retrieved, transformed, combined, etc.) to determine a value for the displayed destination data field is received and stored (306). In some embodiments, a user interface is provided that enables a user to select, e.g., from a menu of options that are structurally valid given the destination data field and/or the mapping as it has been defined via the interface so far, a mapping action to be taken. Examples of menu options include, without limitation, options to insert a source data field; insert or remove specified character(s) and/or types of character (e.g., letters, numbers, symbols); transform the source data (e.g., change to all uppercase, etc.); and operations such as to insert additional characters, strings, and/or source data fields, etc. If the user indicates that further mapping steps are desired to be define (308), e.g. by selecting a "more" or similar control displayed via the user interface, an interface to receive a definition of the further mapping step is provided (310). For example, if an indication is received to "insert field", e.g., at an insertion point indicated by the user via the user interface, a drop down or other menu displaying source data fields available to be inserted may be displayed. Once an indication that the user is done defining the mapping for the current destination data field is received (308), it is determined whether there are further destination data fields for which the data mapping is yet to be defined (312). If so, a next destination data field for which a data mapping is to be defined is determined (314), e.g., selected by the user from a displayed list of destination data fields for which a mapping has not yet been defined, and the next destination data field and an initial view of a user interface to define a data mapping for the destination data field is displayed (304). Successive iterations of steps 304, 306, 308, 310, 312, and 314 are performed, as applicable, for each destination data field for which a mapping is to be defined. Once a data mapping definition has been received for all destination data fields to be defined (e.g., all that exist, all those for which the user currently indicates a desire to define, etc.) (312), the data mapping definition is saved and processed (316) and the process of FIG. 3 ends.

Figure 4:
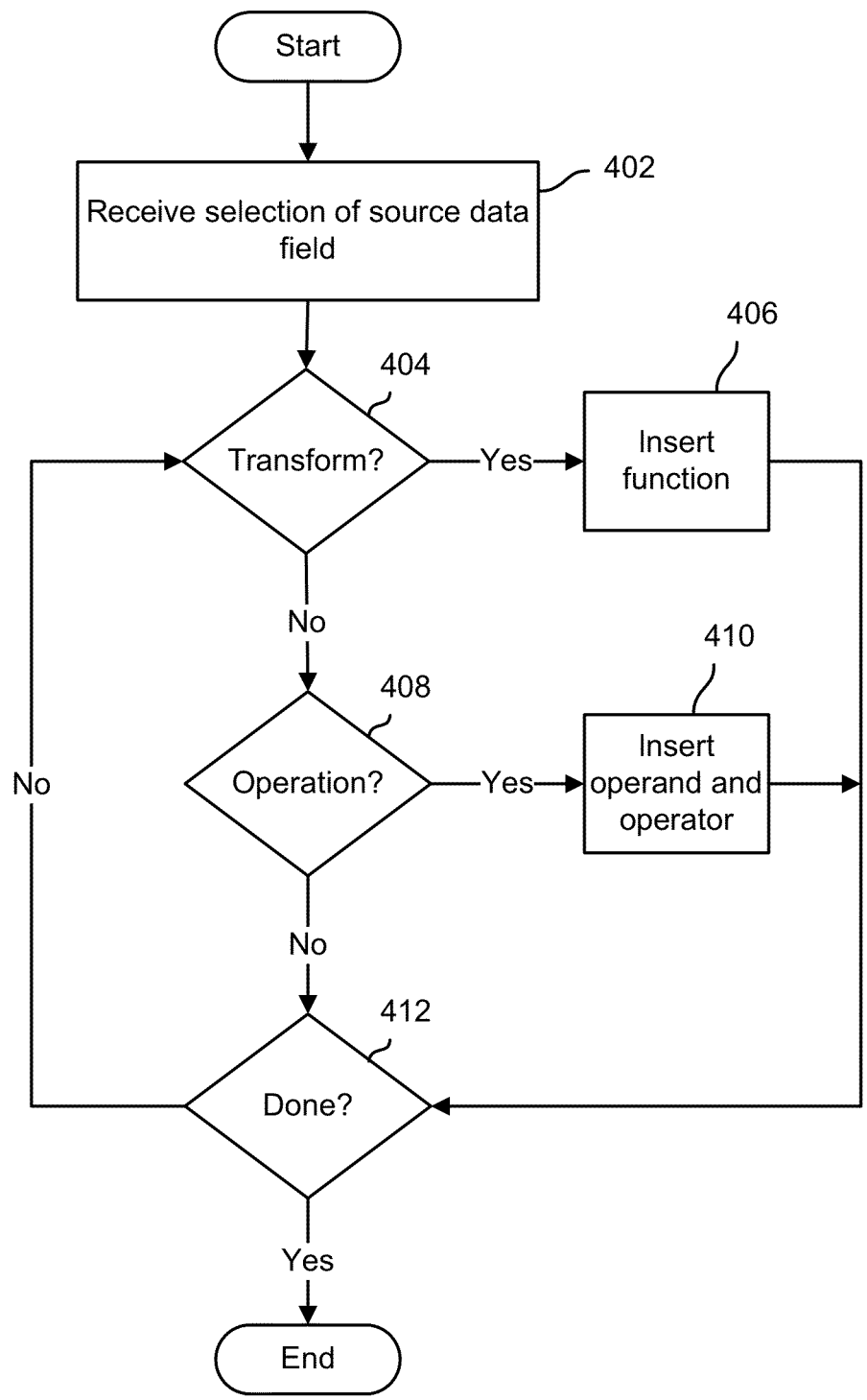
FIG. 4 is a flow chart illustrating an embodiment of a process to map data.

FIG. 4 is a flow chart illustrating an embodiment of a process to map data. In some embodiments, the process of FIG. 4 may be used to receive and process and mapping definition with respect to a destination data field, as in one or more of steps 304, 306, 308, and 310 of FIG. 3. In the example shown, a selection of a source data field to be mapped to the destination data field with respect to which the iteration of the process of FIG. 4 is being performed is received (402). For example, a source data field may be selected by the user via a graphical user interface to be mapped to the destination data field, for example by selecting the source data field from a drop down or other menu. In some embodiments, the menu may be displayed and/or otherwise provided in response to receiving an indication to insert a source field as part of the data mapping definition for the destination data field. If an indication is received that a data transformation is desired to be performed in connection with the data mapping (404), a function to perform the indicated transformation is inserted in the definition and a representation of the inserted function is displayed to the user (406). In some embodiments, a user indicates an insertion point in the data mapping workflow and the function is inserted at that point and interpreted to be applied to a source data field and/or other (e.g., intermediate result) data value associated with the data mapping definition in the context of the insertion point. For example, a transformation to keep only letters may be applied to a source data field value if inserted immediately after insertion of the source data field in the mapping and before any other transformation or operation is indicated to be performed. If an indication is received to include in the definition a step to perform a specified operation with respect to an associated operand (408), the corresponding operand and an operator associated with the operation are inserted (410). In some embodiments, the operand and operator are inserted in that order, i.e., operand first followed by operator, to provide and/or preserve a postfix (e.g., reverse Polish notation) notation for the definition. For example, receipt of an indication to include an operation to insert an indicated source field at a point after previously-defined content (e.g., other characters and/or source data fields) in some embodiments may result in the indicated source data field being displayed as an operand followed by a representation of an operator associated with combining the source data field with the result to that point, e.g., a "+" operator or the word "combine". In some embodiments, selection of a menu option to "insert field" would result in a menu or other interface being provided to select the source field, and a representation of the source field (operand) followed by the operator to combine (e.g., "+", "combine", and/or "combine A and B") would be displayed. The interface to define a mapping for the destination data field currently being processed is displayed, and successive iterations of steps 404 and 406 and/or 408 and 410, as invoked, may be performed, until the user is done defining the mapping for that destination data field (412), at which time the process of FIG. 4 ends.

Figure 5:
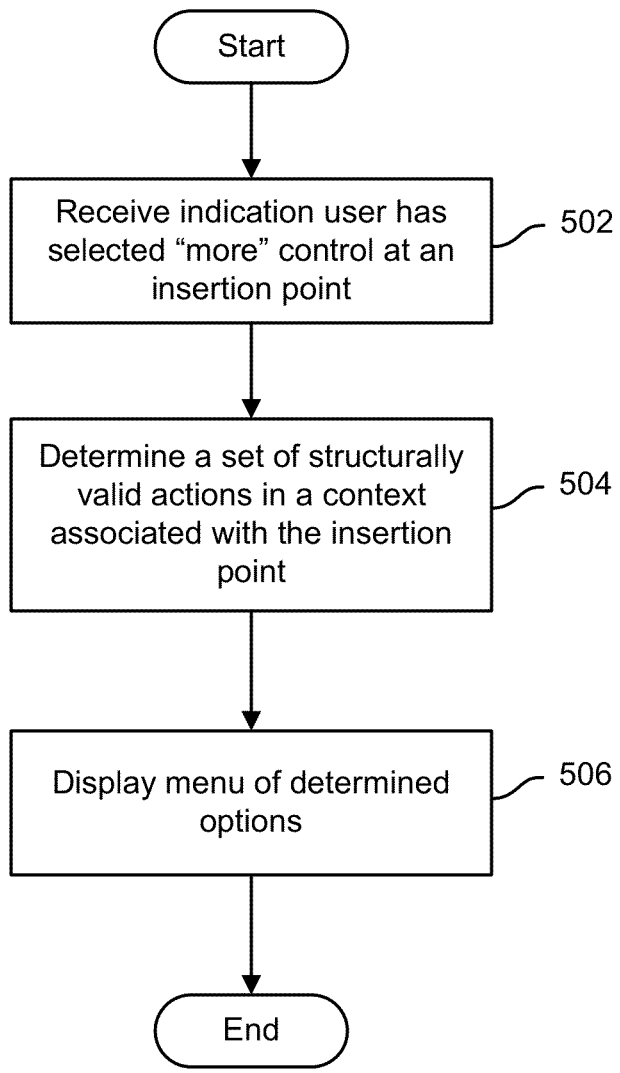
FIG. 5 is a flow chart illustrating an embodiment of a process to provide an interface to define a data mapping.

FIG. 5 is a flow chart illustrating an embodiment of a process to provide an interface to define a data mapping. In the example shown, an indication is received that a user has selected a "more" or similar control displayed, in a graphical data mapping definition user interface, at a display location (e.g., an insertion point) associated with a data mapping definition context (502). For example, a control may be displayed at one or more insertion points in a data mapping work flow comprising the definition of a data mapping for a particular destination data field. A set of data mapping definition related actions that would be structurally valid if inserted at the selected insertion point, giving a data mapping definition context associated with the insertion point, are determined (504). A menu or other presentation of the determined structurally valid options is generated and displayed (506).

FIGS. 6A-6K show a set of exemplary screen shots of a data mapping service graphical user interface and experience as provided in various embodiments.

Figure 6A:
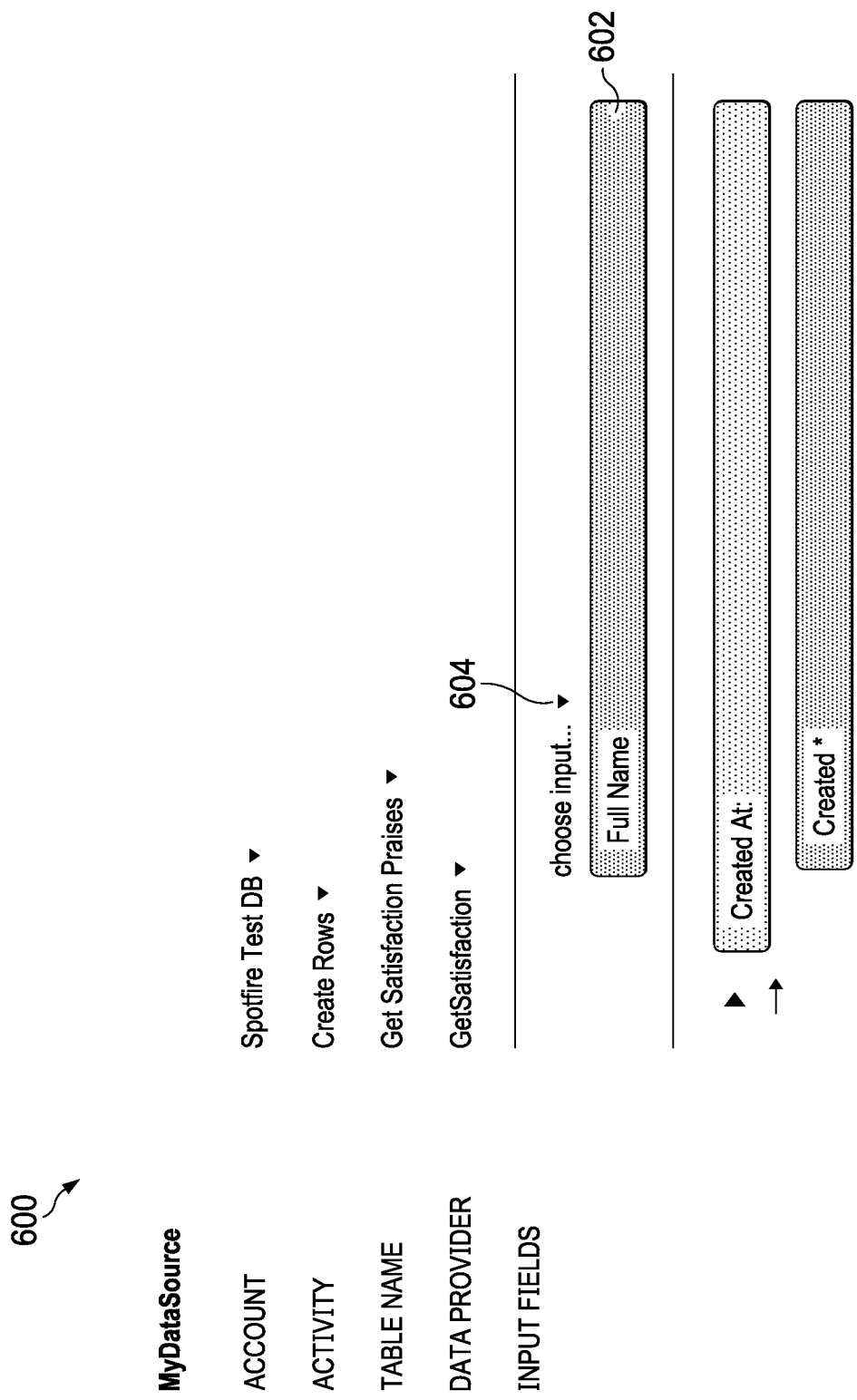
FIG. 6A shows a graphical user interface screen 600 provided in some embodiments to enable a user to define a mapping from a data source to a destination data storage system and/or service.

FIG. 6A shows a graphical user interface screen 600 provided in some embodiments to enable a user to define a mapping from a data source to a destination data storage system and/or service. In the example shown, the data source is indicated as "MyDataSource" and the account and other information for the destination data storage service and/or system, in this example a TIBCO® Spotfire® instance, are shown. In some embodiments, the downward pointing triangles to the right of the account information items are selectable controls, which the user can use to select from a range of options available to the user, e.g., based on the user's identity and/or credentials. In the example shown, the user has selected the destination data field "Full Name" 602 as the first (or current) destination data field for which a mapping is to be defined. A "choose input" control 604 is provided to enable a user to select an input, such as a source data field, to be used in a manner to be indicated via the interface 600 to determine a data value to be mapped to the destination data field "Full Name" 602.

FIG. 6B shows the interface 600 in a state in which a user has selected the "choose input" control 604. In the example shown, selection of control 604 has resulted in a menu 606 being displayed. As shown, the menu 606 provides to the user selectable options to "insert character", e.g., a character or set of characters to be provided by the user via a text box or other input element, and an option to select either the "First Name" source data field or the "Last Name" source data field from an source data entity "AUTHOR".

FIG. 6C shows the interface 600 in a state in which the user has selected from the menu 606 of FIG. 6B the option to insert the source data field "First Name" from the entity "Author", as indicated in inserted field display object 608. Insertion of field 608 has resulted in this example in an insertion point control 610 being added and displayed in a position immediately following inserted field display object 608. In various embodiments, selection of insertion point control 610 provides a menu of options that would be structurally valid at that insertion point to further define how a data value for the destination data field "Full Name" 602 is to be determined.

Figure 6D:
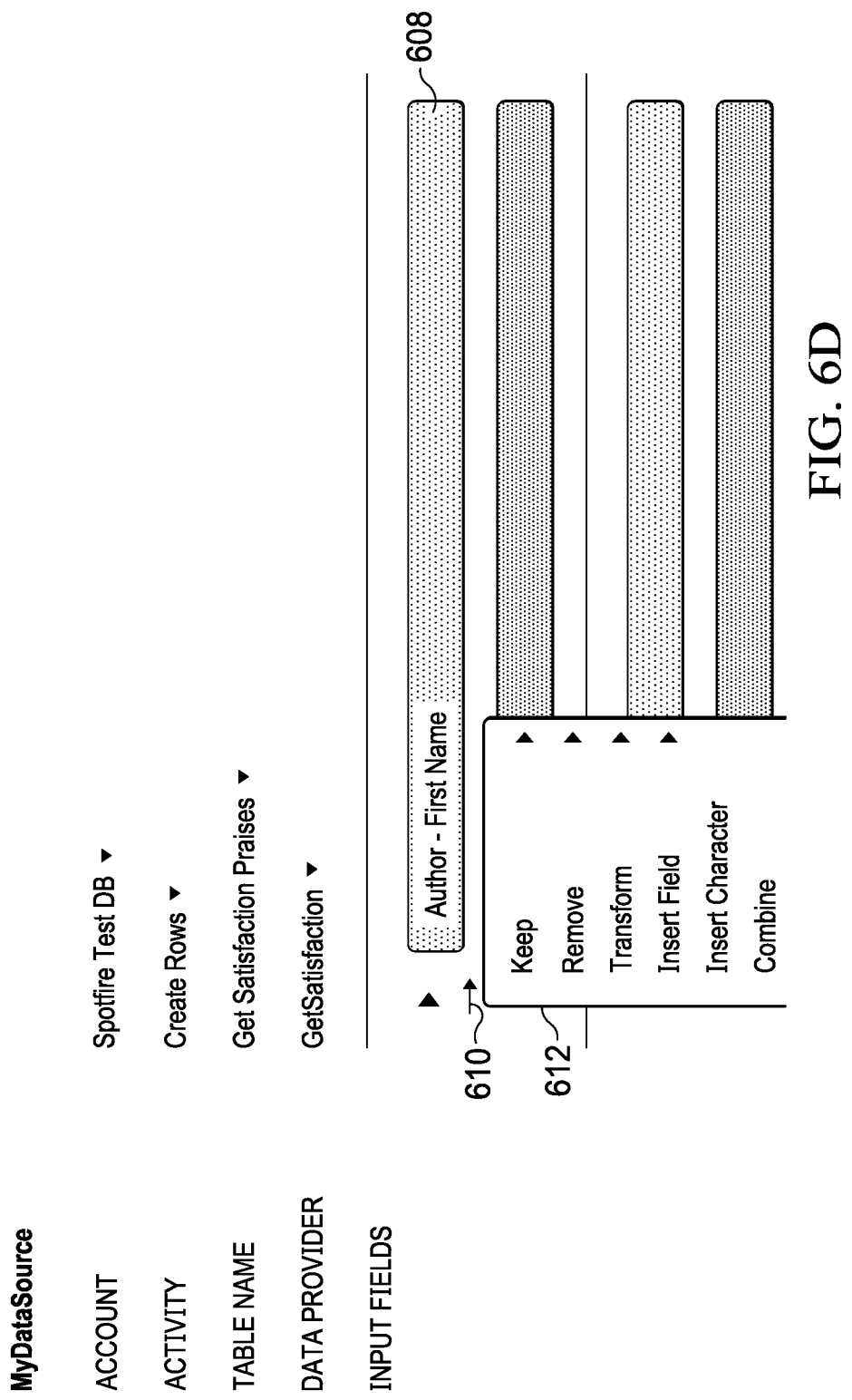
FIG. 6D shows the interface 600 in a state in which the user has selected the insertion point control 610 of FIG. 6C.

FIG. 6D shows the interface 600 in a state in which the user has selected the insertion point control 610 of FIG. 6C. In the example shown, a menu of options that would be structurally valid at insertion point 610 to further define a value for "Full Name" field 602 are displayed in menu 612. In the example shown, options to "Keep" or "Remove" characters, values, etc. to be defined or selected in a related submenu; to "Transform" the previously inserted field and/or intermediate result in a manner to be defined via one or more submenus; to "Insert Field", e.g., a further source data field, as selected from a submenu; and to "Insert Character", e.g., one or more characters to be entered in an input box or field that would be displayed upon selection of the option, are provided. In this example, an option to "Combine" is ghosted out, in this case because that option would not be structurally valid based on the current state of the mapping definition, since there is only one value, source data field "Author—First Name" 608, on which a transformation and/or operation could be performed.

FIG. 6E shows the interface 600 in a state in which the user has selected the option to "insert character" from the menu 612 of FIG. 6D. In the example shown, selection of the "insert character" option has resulted in the addition of a number of elements to the interface 600. For example, an inserted character input/display box 614 has been added at the insertion point selected by the user to insert a character, in this example immediately following insertion of the source data field "Author—First Name" 602. In this example, in the state shown a single space has been entered in inserted character input/display box 614. In addition, labels "a" and "b" have been added, to provide a shorthand reference to the inserted source data field "Author—First Name" 602 and inserted character input/display box 614, respectively. In addition, the operator "combine" and an identification of the operands with respect to which the operation is to be performed has been inserted, and labeled with the reference "c". The steps labeled "b" and "c" both were added in response to selection of the option "insert character" from menu 612 of FIG. 6D, providing representation of the process steps in a manner that embodies a postfix notation, which in various embodiments facilitates serialization of the data mapping definition and execution of a process based thereon. Referring further to FIG. 6E, a user selectable insertion point control 616 has been included, below the line "c", to enable the user to add further to the mapping definition.

Figure 6F:
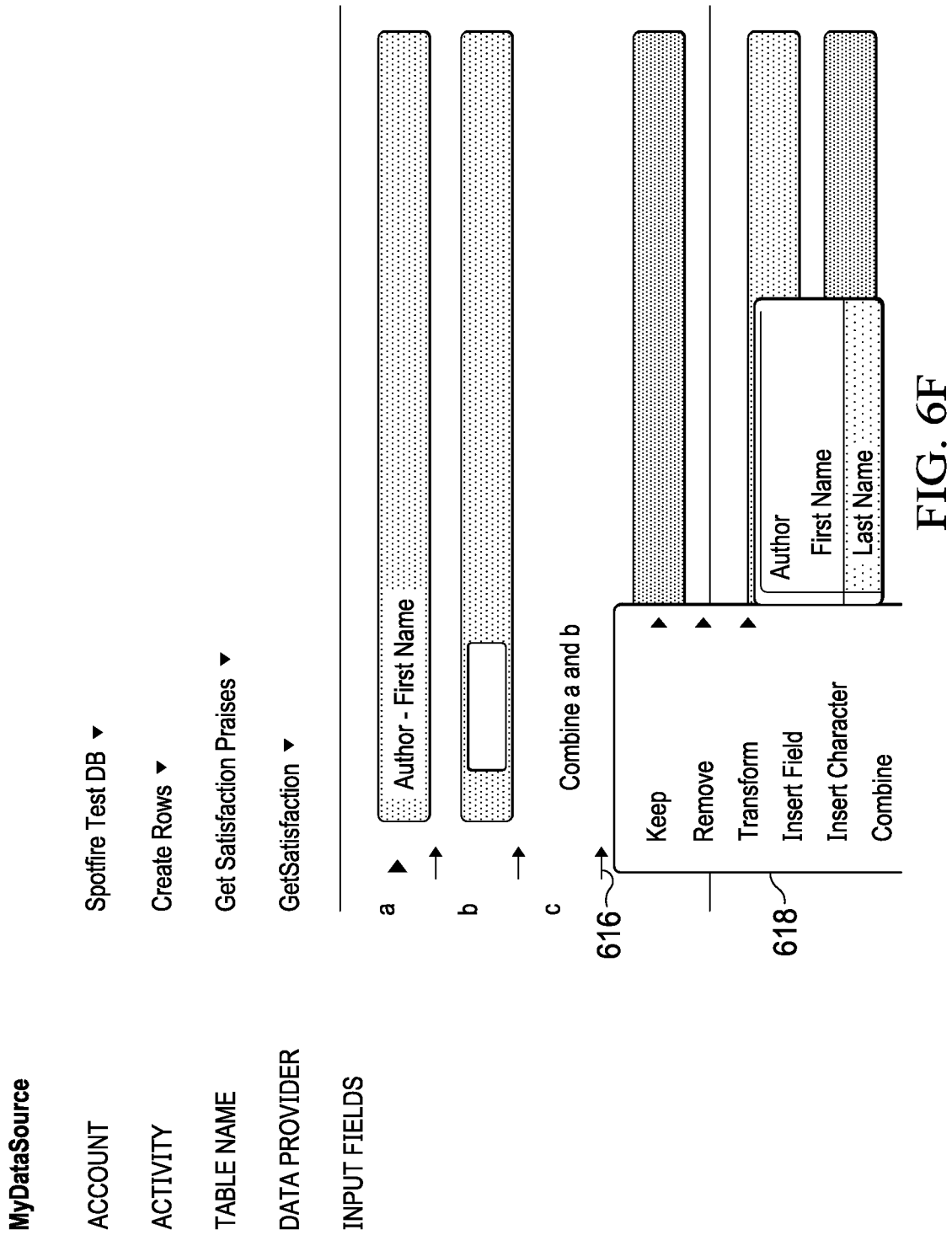
FIG. 6F shows the interface 600 in a state in which the user has selected the insertion point control 616 of FIG. 6E.

FIG. 6F shows the interface 600 in a state in which the user has selected the insertion point control 616 of FIG. 6E. In the example shown, selection of insertion point control 616 has resulted in a menu 618 being displayed. In the state shown, the option to "Insert Field" has been selected or pre-selected (e.g., by mouse-over), and sub-options to select a specific source data field to be inserted at the insertion point are provided.

Figure 6G:
FIG. 6G shows a portion of the interface 600 in a state in which the user has selected from the menu 618 of FIG. 6F the option to "insert field" and the sub-option to specify the "Last Name" source data field from the "AUTHOR" entity as the field to be inserted.

FIG. 6G shows a portion of the interface 600 in a state in which the user has selected from the menu 618 of FIG. 6F the option to "insert field" and the sub-option to specify the "Last Name" source data field from the "AUTHOR" entity as the field to be inserted. In the example shown, selection of the option to insert the "Last Name" source data field has resulted in a displayed box 620 representing insertion of "Author—Last Name" source data field, labeled "d" in the interface 600 for reference, and also an operation (labeled line "e") to "combine" the "Author—Last Name" source data field 620 with the intermediate result determined by the operation represented by line "c", i.e., by combining the "Author—First Name" source data field 608 with the single space entered in insert character input/display box 614. In this example, the use of postfix notation has been maintained. In addition, additional insertion point controls (right-pointing arrows) have been provided before and after the elements added to the interface as a result of the user's selection of the option to insert the "Author—Last Name" source data field 620 at the point indicated by the user.

Figure 6H:
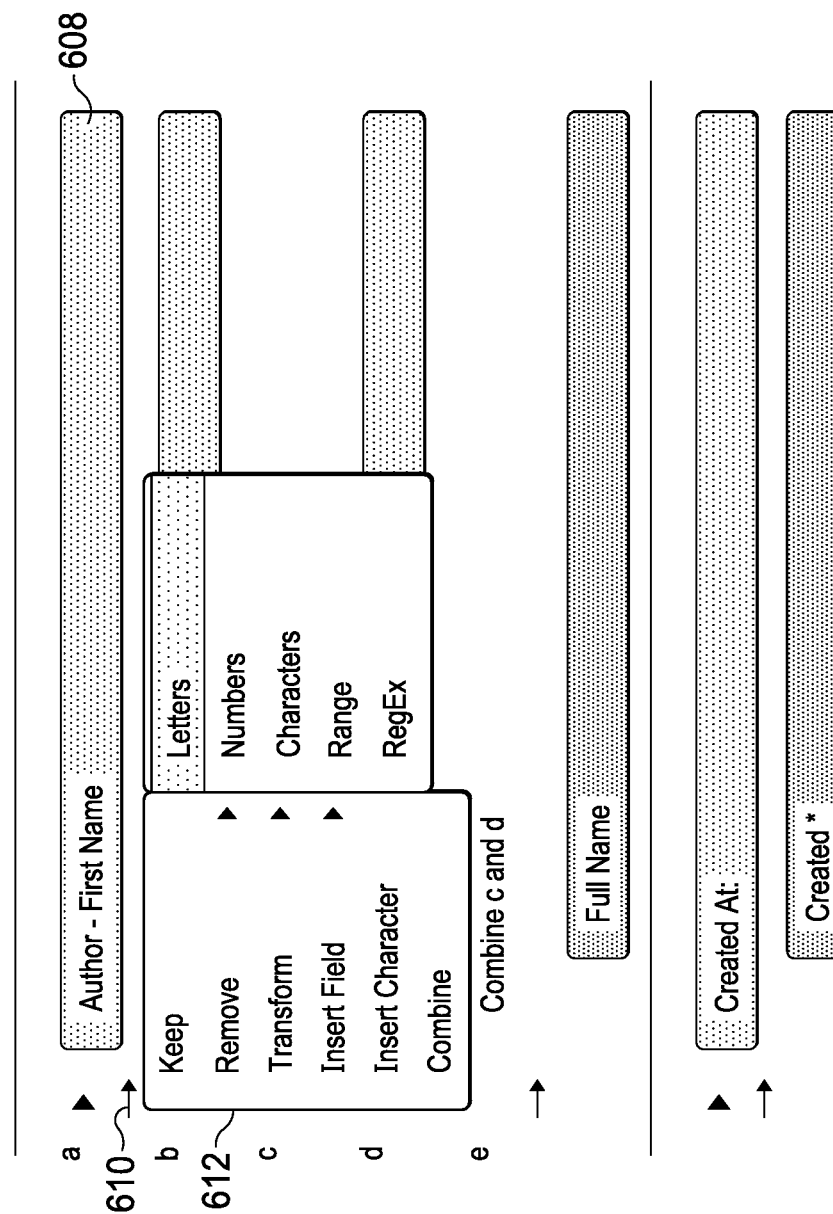
FIG. 6H shows a portion of the interface 600 in a state in which the user has selected insertion point control 610, immediately following "Author—First Name" source data field 608, resulting in the menu 612 being displayed again.

FIG. 6H shows a portion of the interface 600 in a state in which the user has selected insertion point control 610, immediately following "Author—First Name" source data field 608, resulting in the menu 612 being displayed again. While in the example shown, menu 612 provides the same top level options as in FIG. 6D, in some embodiments, more, fewer, and/or different options may have been included in menu 612 as shown in FIG. 6H, for example if one or more options displayed as shown were not structurally valid given the state of the data mapping definition at the time. As shown in FIG. 6H, the menu option labeled "Keep" has been selected or pre-selected, resulting in a submenu providing options to "keep" letters, numbers, (user-specified) characters, a range of values, or values determined by application of a user-defined or other regular expression ("RegEx") are provided.

Figure 6I:
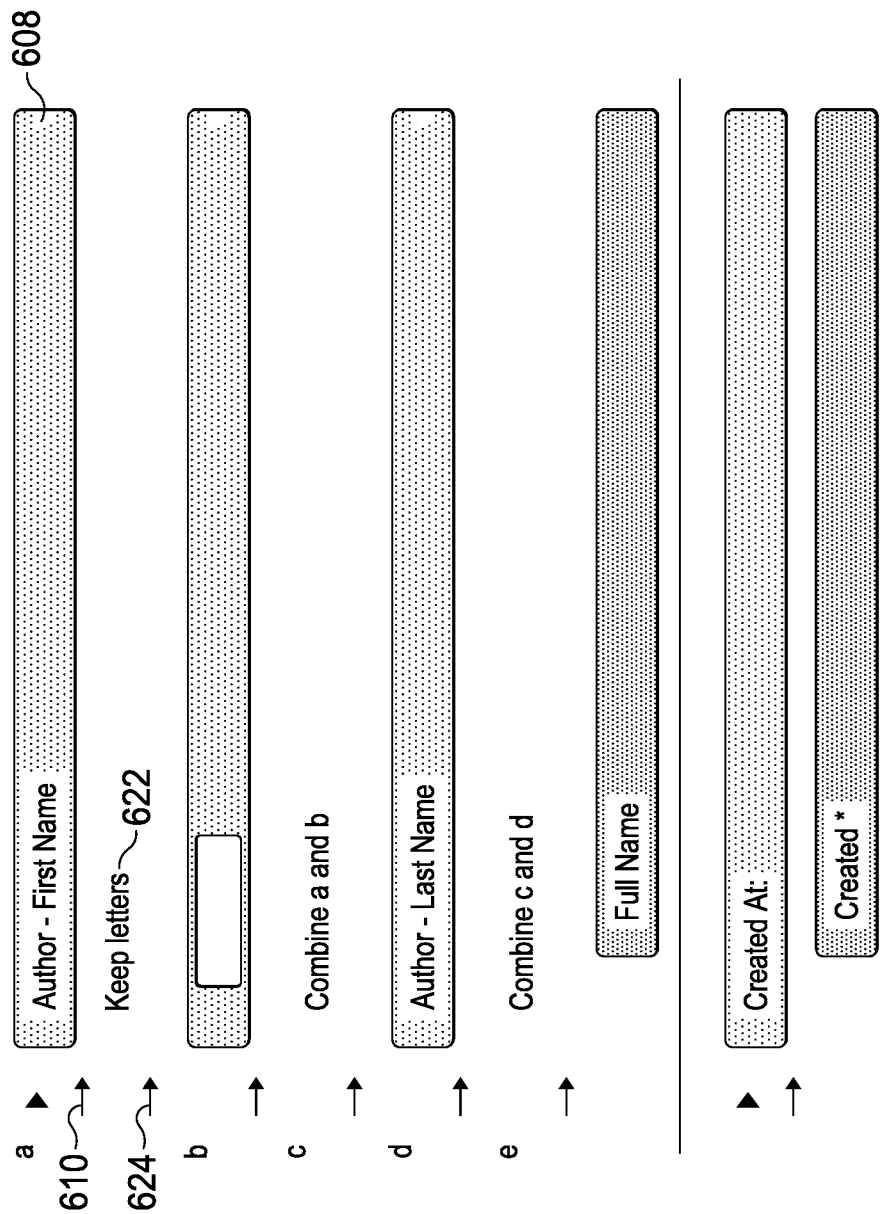
FIG. 6I shows a portion of the interface 600 in a state in which the user has selected from the menu 612 as shown in FIG. 6H the option to "keep" and the sub-option "letters".

FIG. 6I shows a portion of the interface 600 in a state in which the user has selected from the menu 612 as shown in FIG. 6H the option to "keep" and the sub-option "letters". In the example shown, the user's action has resulted in a representation 622 of a transformation and/or function to "keep letters" being inserted immediately below the "Author—First Name" source data field 608 and associated insertion point control 610. In addition, an insertion point control 624 is provided immediately following the "keep letters" transformation/function 622. In various embodiments, addition of the transformation to "keep letters" 622 immediately following the "Author—First Name" source data field 608 would be understood by the data mapping service with which the interface 600 is associated to indicate that a function to keep only letter characters should be applied to instances of the "Author—First Name" source data field, resulting in non-letter characters being removed. An example of when such a transformation may be desired or required include situations in which only letter characters may be stored in the destination data field to which data is being mapped.

Figure 6J:
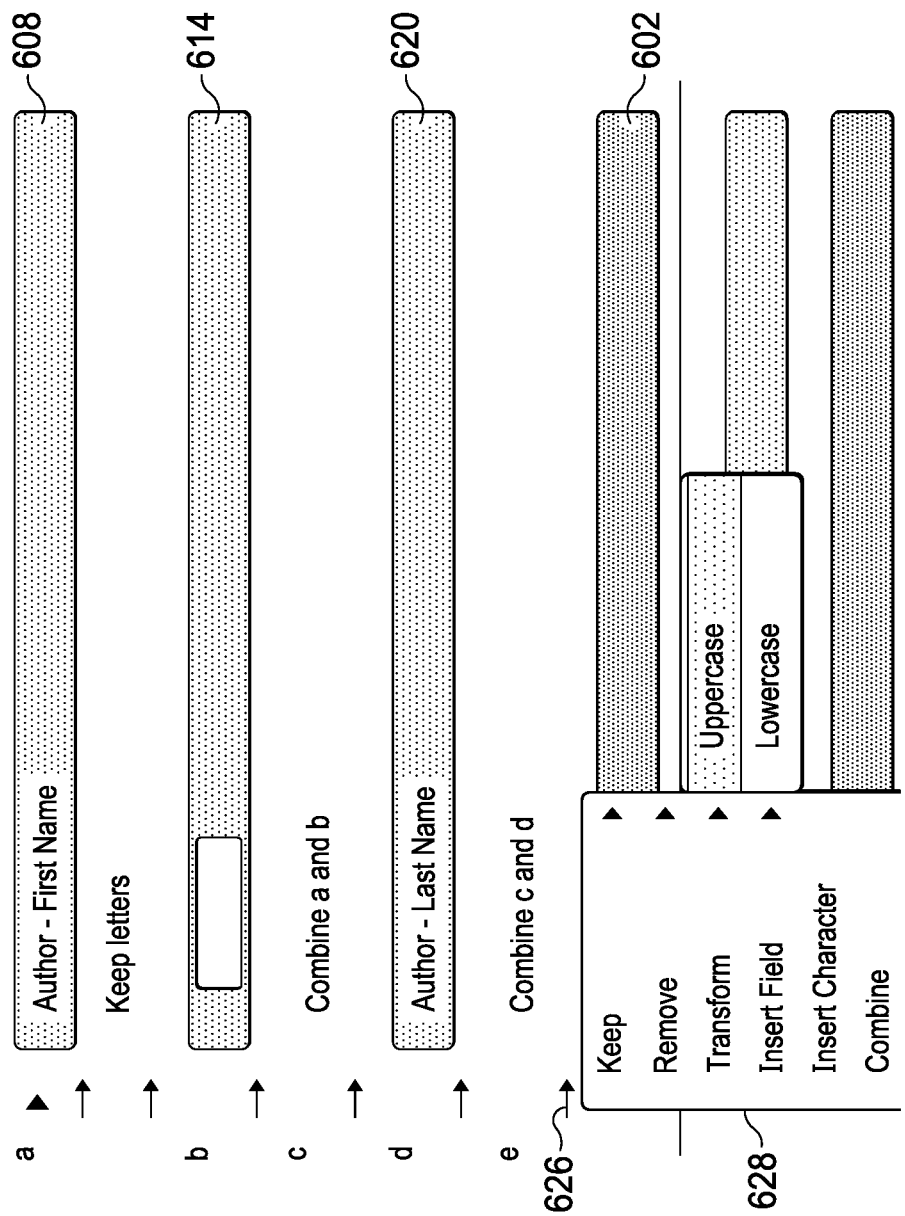
FIG. 6J shows a portion of the interface 600 in a state in which an insertion point control 626 has been selected.

FIG. 6J shows a portion of the interface 600 in a state in which an insertion point control 626 has been selected. In the example shown, insertion point control 626 is displayed immediately following the operation (labeled "e") to combine the intermediate result determined at line "c" (i.e., to combine the intermediate result determined up to that point, which in this example in the state shown would include starting with the "Author—First Name" source data field 608, keeping only the letters of the data value from that field, and combining that intermediate result with a single space 614), with the corresponding value from the "Author—Last Name" source data field 620 (labeled line "d" for reference). In the example shown in FIG. 6J, selection of insertion point control 626 has resulted in menu 628 being displayed. In the example shown, an option to "Transform" the value as computed to that point has been selected or pre-selected, resulting in options to make all characters "uppercase" or to make all characters "lowercase" being displayed. In some embodiments, the options displayed are the ones determined by the data mapping service user interface code, based on the state of the current definition as defined up to that point by the user via the graphical user interface 600, as being structurally valid to insert at the point in the definition with which insertion point control 626 is associated.

Figure 6K:
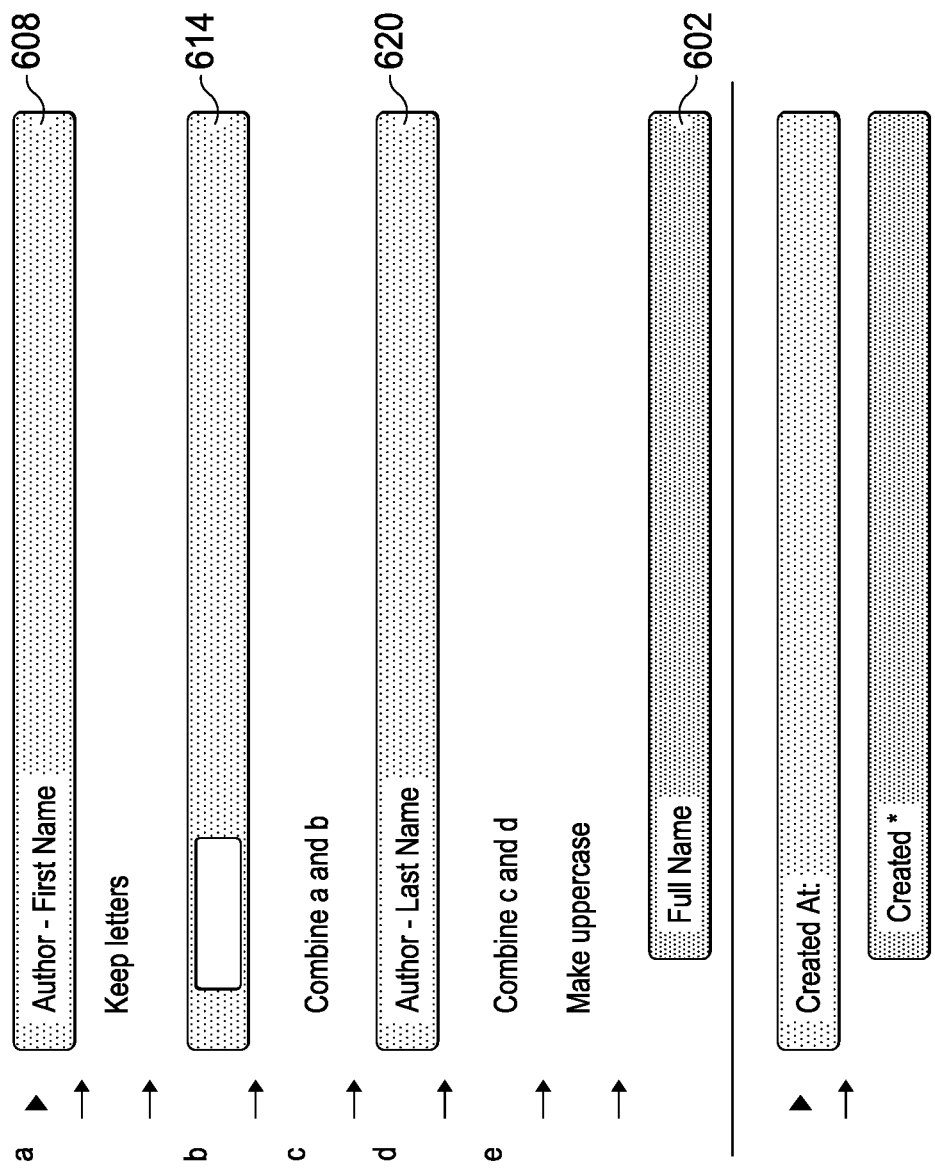
FIG. 6K shows a portion of the interface 600 in a state in which the user has selected from the menu 628 of FIG. 6J the option to "Transform" and the sub-option "Uppercase".

FIG. 6K shows a portion of the interface 600 in a state in which the user has selected from the menu 628 of FIG. 6J the option to "Transform" and the sub-option "Uppercase". In the example shown, the user's action has resulted in display of a representation to "Make uppercase" immediately following line "e", i.e., at the insertion point selected by the user.

In various embodiments, the graphical user interface 600 and associated backend user interface code would enable further steps to be added, e.g., by selection of insertion points as shown in FIG. 6K, and/or refined or redefined, e.g., by selecting the displayed boxes 608, 614, or 620. In some embodiments, an order of data mapping definition steps can be changed by dragging and dropping at a new insertion point a displayed representation of a processing step. For example, dragging the "make uppercase" transformation to a location immediately above line "e" but below "Author—Last Name" source data field 620 in some embodiments would result in a definition in which the data value associated with the "Author—Last Name" source data field 620 being made uppercase and the resulting all uppercase string being combined with the intermediate result determined as a result of the operation represented by line "c", which intermediate result would not be made all uppercase.

Figure 7:
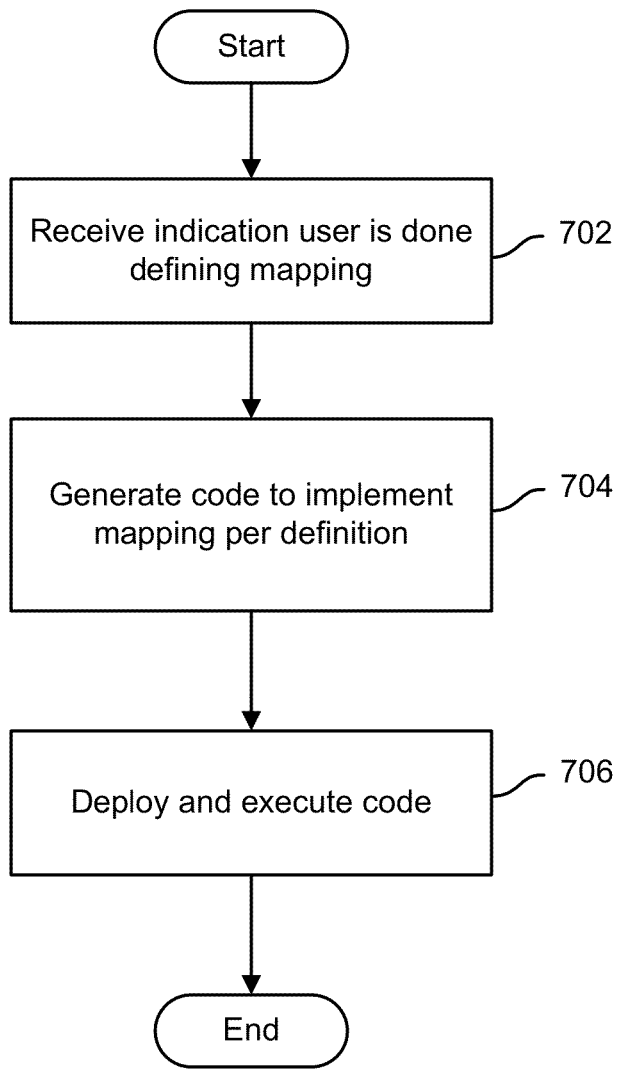
FIG. 7 is a flow chart illustrating an embodiment of a process to map data.

FIG. 7 is a flow chart illustrating an embodiment of a process to map data. In some embodiments, the process of FIG. 7 may be used to implement step 206 of FIG. 2. In the example shown, an indication is received that a user is done defining a data mapping for specified data to be mapped from a data source to a designated destination system (702). For example, the user may have selected a "done" or "submit" or like control via a graphical user interface. Code to implement the data mapping per the definition is generated (704). For example, one or more software objects, modules, and/or other entities configured to perform data mapping in accordance with the definition may be generated. Examples of generated code include without limitation code to connect to a data source, log in to an account at the data source, retrieve specified data from specified data structures (e.g., database tables) at the data source, and transform and/or perform further operations with respect to the source data, in accordance with the data mapping definition, to generate corresponding data values to be stored and/or otherwise used at the destination system. The generated code is deployed and executed (706).

Figure 8:
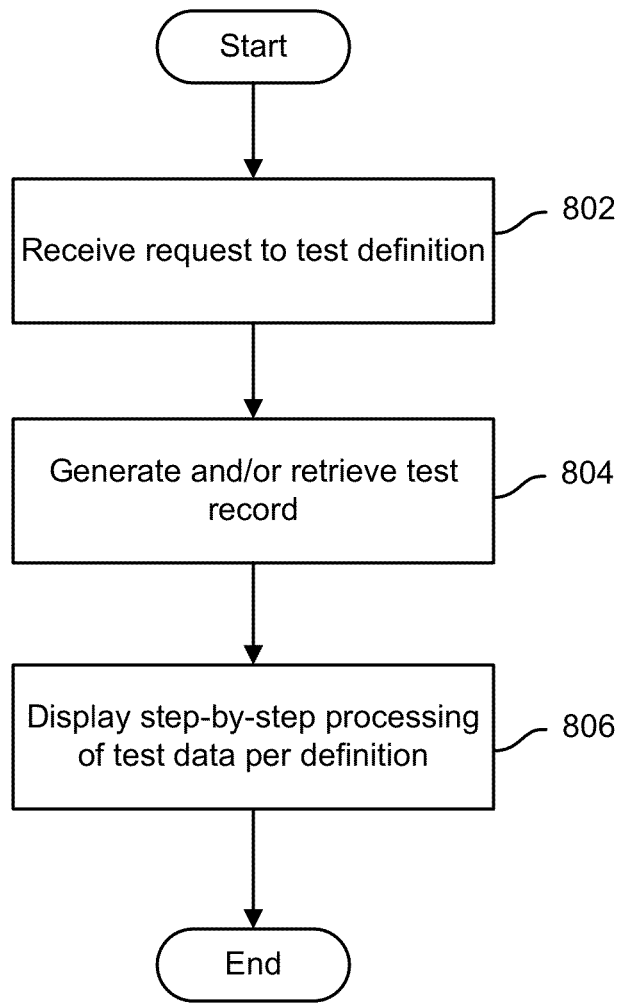
FIG. 8 is a flow chart illustrating an embodiment of a process to perform a test run of a data mapping definition.

FIG. 8 is a flow chart illustrating an embodiment of a process to perform a test run of a data mapping definition. In the example shown, a request or other indication is received to perform and display a "test run" of a data mapping definition (802). A test record comprising source data values required to perform the test run is generated and/or retrieved (804). For example, a first record in a range of records associated with the data mapping definition may be retrieved. The processing indicated by the data mapping definition is performed in accordance with the data mapping definition, with intermediate (if any) and final resulting data values being displayed to the user, e.g., via a view of the data mapping definition graphical user interface (806).

Figure 9:
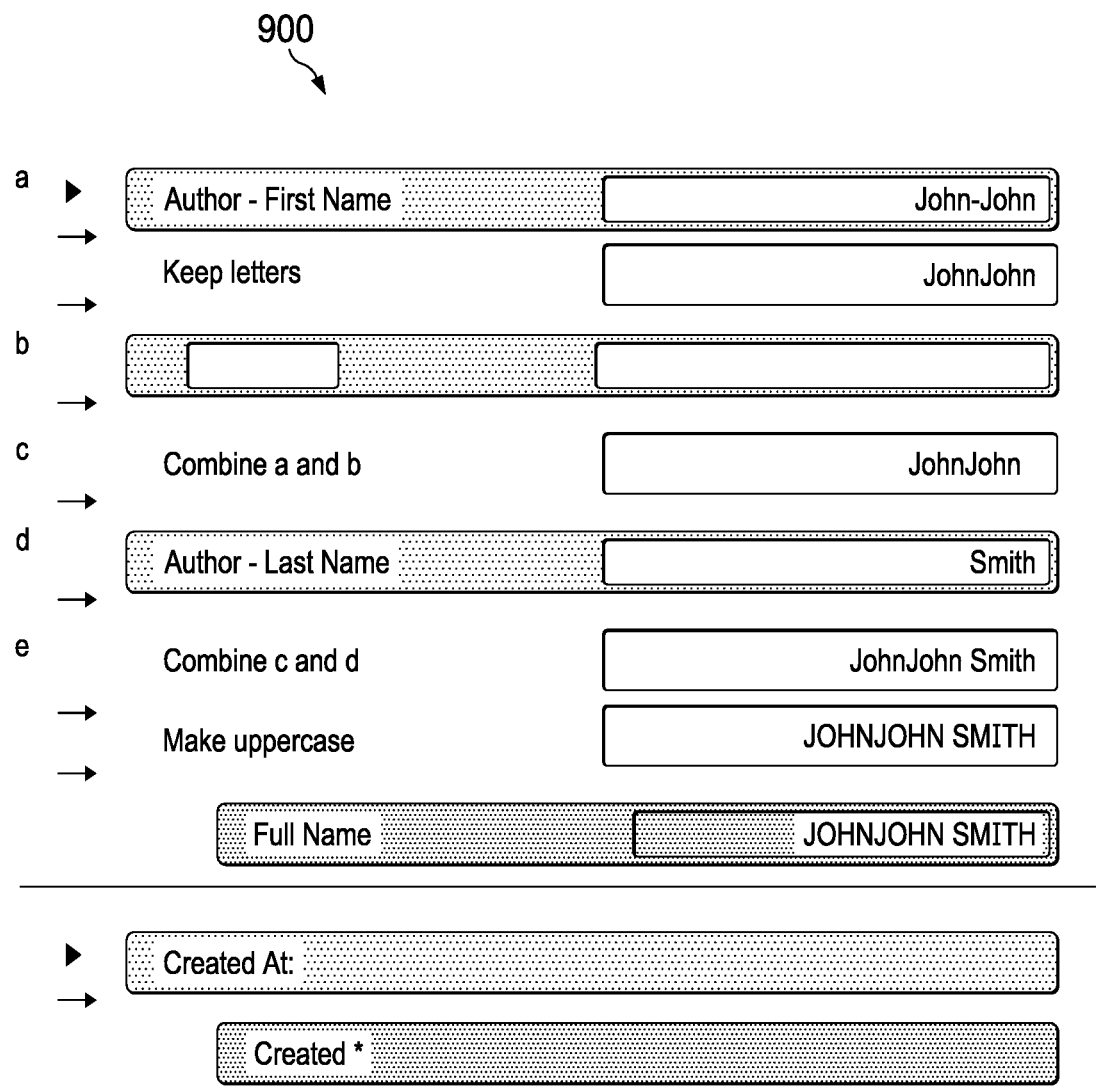
FIG. 9 shows a screen shot of a user interface and experience, as provided in some embodiments, to display a test run of a mapping definition.

FIG. 9 shows a screen shot of a user interface and experience, as provided in some embodiments, to display a test run of a mapping definition. In the example shown, a definition created as in the example shown in FIGS. 6A-6K has been tested using a retrieved and/or generated source data record having a source data value of "John-John" in the "First Name" source data field of the source data entity "Author" and a source data value of "Smith" in the "Last Name" source data field of the source data entity "Author". In the test run display 900 of FIG. 9, at each step of the definition a corresponding data value, in applicable steps representing an intermediate result of processing performed in that step or in one or more processing steps above, is displayed. Specifically, in the line labeled "a" the source data value "John-John" is displayed at the right. In the next line, the result of the transformation to "keep (only) letters" is displayed, i.e., the hyphen has been removed. In the line labeled "b", the single space entered in the box at the left is displayed in the display box on the right, and in the next line, labeled "c", a result of combining the result obtained by applying the "keep letters" transformation to the source data field value shown at line "a" with the space inserted at line "b" is displayed, i.e., "JohnJohn". In the line labeled "d", the corresponding source data value "Smith" is displayed, and in the line labeled "e" the result obtained by combining the intermediate result shown in line "c" with the source data value "Smith" displayed at line "d" is shown, i.e., "JohnJohn Smith". In the next line, a result obtained by making uppercase all characters in the intermediate result obtained at line "e" is shown, and since that is the final step in the data mapping for the destination data field "Full Name" as defined, the final result "JOHNJOHN SMITH" is displayed at the right end of the box labeled "Full Name". In some embodiments, a test run as shown in FIG. 9 may be requested and viewed by selecting a user control, such as the triangle shown to the right of the "Author—First Name" input field in the example shown in FIG. 9.

In various embodiments, a data mapping service and interface as disclosed herein may enable even a relatively unsophisticated user to define a data mapping.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of mapping data to destination database table fields from source database table fields, comprising:

providing via a displayed user interface a representation of a first destination data field to which the data is to be mapped, wherein the first destination data field is included in a plurality of destination data fields to which a set of source data is to be mapped, and one or more other destination data fields included in the plurality of destination data fields are not displayed at the same time as the first destination data field is displayed;

receiving a user input comprising a selection of a source data input field to be used to determine a data value for the first destination field;

updating, in response to the user input, the displayed user interface to include a representation of the selected source data input field and an insertion point control immediately following the representation of the selected source data input field;

providing, in response to a user selection on the insertion point control, via the displayed user interface a set of structurally valid options to further define how the data value for the first destination field is to be determined based on at least one other data value from the source database table fields, wherein the displayed user interface is updated to prevent a selection of an option that is not valid to insert immediately following the representation of the selected source data input field based at least in part on a current state of a data mapping definition as defined up to an insertion point of the insertion point control;

receiving a second user input comprising a selection of a structurally valid option from the set of structurally valid options to be used to determine the data value for the first destination field;

updating the displayed user interface, in response to the second user input, to include a representation of the selected structurally valid option following the representation of the selected source data input field, an identification of combining the selected structurally valid option with the selected source data input field, and a second insertion point control immediately following the identification of combining in a successive order;

providing, in response to a user selection on the second insertion point control, via the displayed user interface a second set of structurally valid options that are structurally valid to insert immediately following the identification of combining based at least in part on the current state of the data mapping definition as defined up to an insertion point of the second insertion point control; and mapping the data to the first destination field according to the mapping definition determined based at least in part on the user input and the second user input;

the data mapping definition determined based on a valid change of the first destination data field, attributes of the selected source data input field, and other attributes of the first destination data field;

each option of the structurally valid options enables use of the source data input field to determine the data value of the first destination data field, the structurally valid options determined based on the data mapping definition.

2. The method of claim 1, wherein the displayed user interface further includes a displayed set of one or more input data fields, each of said input data fields comprising a data value included in a set of source data.

3. The method of claim 1, further comprising:
receiving an identification of a destination data store to which source data associated with a set of source data is to be mapped; and
accessing the destination data store to determine the plurality of destination data fields to which source data associated with the set of source data is to be mapped.

4. The method of claim 1, wherein the set of structurally valid options is determined based at least in part on a display location at which the insertion point control is displayed within the displayed user interface.

5. The method of claim 4, wherein the set of structurally valid options is determined based at least in part on where the display location at which the insertion point control is displayed relative to displayed information representing one or more steps of the data mapping definition currently displayed in the displayed user interface.

6. The method of claim 1, wherein the set of source data comprises a hierarchically structured set of data having a lowest level comprising a plurality of data value bearing leaf nodes, each of which is a child node of one or more parent nodes at locations higher in a hierarchy of the set of source data; and further comprising including in the set of structurally valid options an option to insert one or more source data input fields, and for each displaying as non-selectable context data an indication of the one or more parent nodes of which the source data input field is a child node.

7. The method of claim 1, wherein the set of structurally valid options includes one or more options to transform data.

8. The method of claim 1, wherein the set of structurally valid options includes one or more options to perform an operation with respect to data.

9. The method of claim 8, wherein the operation comprises an operation to combine an indicated value with an intermediate result.

10. The method of claim 9, wherein the indicated value comprises a user entered set of one or more characters.

11. The method of claim 9, wherein the indicated value comprises a user selected source data input field.

12. The method of claim 9, further comprising updating the displayed user interface to display a representation of the indicated value in a first display location and to display in a second location following the first display location in processing order a representation of an operator associated with combining the intermediate result and the indicated value.

13. The method of claim 1, wherein the displayed user interface provides to a user the ability to define successive steps to be performed to determine the data value for the first destination field; and further comprising using a postfix notation to display via the displayed user interface information representing the successive steps.

14. The method of claim 1, further comprising enabling the displayed user interface to be used to define in successive iterations additional processing steps to be performed to define how the data value for the first destination field is to be determined.

15. The method of claim 1, further comprising receiving an indication to perform and display via the displayed user interface a test run of a data mapping definition that has been defined via the displayed user interface.

16. The method of claim 15, further comprising generating or otherwise obtaining a test record associated with the set of source data; performing a set of process steps that have been defined using the displayed user interface; and displaying in respective locations associated with each of the processing steps an intermediate or final result, as applicable, determined up to that point in the set of processing steps as defined based on the test record.

17. A system of mapping data to destination database table fields from source database table fields, comprising: a display device; and
a processor coupled to the display device and configured to:
provide via a displayed user interface a representation of a first destination data field to which data is to be mapped, wherein the first destination data field is included in a plurality of destination data fields to which a set of source data is to be mapped, and one or more other destination data fields included in the plurality of destination data fields are not displayed at the same time as the first destination data field is displayed;
receive a user input comprising a selection of a source data input field to be used to determine a data value for the first destination field;
update, in response to the user input, the displayed user interface to include a representation of the selected source data input field and an insertion point control immediately following the representation of the selected source data input field;
provide, in response to a user selection on the insertion point control, via the displayed user interface a set of structurally valid options to further define how the data value for the first destination field is to be determined based on at least one other data value from the source database table fields, wherein the displayed user interface is updated to prevent a selection of an option that is not valid to insert immediately following the representation of the selected source data input field based at least in part on a current state of a data mapping definition as defined up to an insertion point of the insertion point control;
receive a second user input comprising a selection of a structurally valid option from the set of structurally valid options to be used to determine the data value for the first destination field;
update the displayed user interface, in response to the second user input, to include a representation of the selected structurally valid option following the representation of the selected source data input field, an identification of combining the selected structurally valid option with the selected source data input field, and a second insertion point control immediately following the identification of combining in a successive order;
provide, in response to a user selection on the second insertion point control, via the displayed user interface a second set of structurally valid options that are structurally valid to insert immediately following the identification of combining based at least in part on the current state of the data mapping definition as defined up to an insertion point of the second insertion point control; and
map the data to the first destination field according to the mapping definition determined based at least in part on the user input and the second user input;
the data mapping definition determined based on a valid change of the first destination data field, attributes of the selected source data input field, and other attributes of the first destination data field;

each option of the structurally valid options enables use of the source data input field to determine the data value of the first destination data field, the structurally valid options determined based on the data mapping definition.

18. The system of claim 17, wherein the set of structurally valid options is determined based at least in part on a display location at which the control is displayed within the displayed user interface; and wherein the set of structurally valid options is determined based at least in part on where the display location at which the insertion point control is displayed relative to displayed information representing one or more steps of the data mapping definition currently displayed in the displayed user interface.

19. The system of claim 17, wherein the set of structurally valid options includes one or more options to transform data.

20. The system of claim 17, wherein the set of structurally valid options includes one or more options to perform an operation with respect to data.

21. The system of claim 17, wherein the set of source data comprises a hierarchically structured set of data having a lowest level comprising a plurality of data value bearing leaf nodes, each of which is a child node of one or more parent nodes at locations higher in a hierarchy of the set of source data; and further comprising including in the set of structurally valid options an option to insert one or more source data input fields, and for each displaying as non-selectable context data an indication of the one or more parent nodes of which the source data input field is a child node.

22. A computer program product embodied in a non-transitory computer readable medium and comprising computer instructions for mapping data to destination database table fields from source database table fields, the computer instructions configured to:

providing via a displayed user interface a representation of a first destination data field to which data is to be mapped, wherein the first destination data field is included in a plurality of destination data fields to which a set of source data is to be mapped, and one or more other destination data fields included in the plurality of destination data fields are not displayed at the same time as the first destination data field is displayed;

receiving a user input comprising a selection of a source data input field to be used to determine a data value for the first destination field;

updating, in response to the user input, the displayed user interface to include a representation of the selected source data input field and an insertion point control immediately following the representation of the selected source data input field;

providing, in response to a user selection on the insertion point control, via the displayed user interface a set of structurally valid options to further define how the data value for the first destination field is to be determined based on at least one other data value from the source database table fields, wherein the displayed user interface is updated to prevent a selection of an option that is not valid to insert immediately following the representation of the selected source data input field based at least in part on a current state of a data mapping definition as defined up to an insertion point of the insertion point control;

receiving a second user input comprising a selection of a structurally valid option from the set of structurally valid options to be used to determine the data value for the first destination field;

updating the displayed user interface, in response to the second user input, to include a representation of the selected structurally valid option following the representation of the selected source data input field, an identification of combining the selected structurally valid option with the selected source data input field, and a second insertion point control immediately following the identification of combining in a successive order;

providing, in response to a user selection on the second insertion point control, via the displayed user interface a second set of structurally valid options that are structurally valid to insert immediately following the identification of combining based at least in part on the current state of the data mapping definition as defined up to an insertion point of the second insertion point control; and mapping the data to the first destination field according to the mapping definition determined based at least in part on the user input and the second user input;

the data mapping definition determined based on a valid change of the first destination data field, attributes of the selected source data input field, and other attributes of the first destination data field;

each option of the structurally valid options enables use of the source data input field to determine the data value of the first destination data field, the structurally valid options determined based on the data mapping definition.

* * * * *